United States Patent
Shiralkar et al.

(10) Patent No.: US 12,170,676 B1
(45) Date of Patent: *Dec. 17, 2024

(54) PROVIDING FLEXIBLE SERVICE ACCESS USING IDENTITY PROVIDER

(71) Applicant: Okta, Inc., San Francisco, CA (US)

(72) Inventors: Dipti Vivek Shiralkar, San Jose, CA (US); Arun Thotta Suresh, Bellevue, WA (US); Mohammad Rahimi, San Carlos, CA (US); Ankit Garg, Redwood City, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/315,429

(22) Filed: May 10, 2023

Related U.S. Application Data

(63) Continuation of application No. 17/076,760, filed on Oct. 21, 2020, now Pat. No. 11,689,537.

(51) Int. Cl.
*H04L 9/40* (2022.01)
*G06N 20/00* (2019.01)

(52) U.S. Cl.
CPC ........... *H04L 63/105* (2013.01); *G06N 20/00* (2019.01); *H04L 63/0876* (2013.01); *H04L 63/20* (2013.01)

(58) Field of Classification Search
CPC ... H04L 63/105; H04L 63/0876; H04L 63/20; G06N 20/00
USPC .......................................................... 726/1
See application file for complete search history.

(56) References Cited

U.S. PATENT DOCUMENTS

| | | | | |
|---|---|---|---|---|
| 11,256,661 | B1* | 2/2022 | Gassner | G06F 21/6227 |
| 11,552,953 | B1* | 1/2023 | Avadhanam | H04L 63/102 |
| 2007/0124803 | A1* | 5/2007 | Taraz | H04L 63/105 |
| | | | | 726/4 |
| 2011/0179477 | A1 | 7/2011 | Starnes et al. | |
| 2012/0216244 | A1* | 8/2012 | Kumar | G06F 21/31 |
| | | | | 726/1 |
| 2015/0341348 | A1 | 1/2015 | Yang et al. | |
| 2017/0302667 | A1 | 10/2017 | Podal et al. | |

(Continued)

FOREIGN PATENT DOCUMENTS

WO    WO 2018/232304 A1    12/2018

OTHER PUBLICATIONS

PCT International Search Report and Written Opinion, PCT Application No. PCT/US2021/055931, Feb. 17, 2022, nine paqes.

*Primary Examiner* — Kambiz Zand
*Assistant Examiner* — Aubrey H Wyszynski
(74) *Attorney, Agent, or Firm* — Holland & Hart LLP

(57) ABSTRACT

A service provider provides flexible access to services using an identity provider. The service provider is associated with a custom access policy used by the identity provider to authenticate access requests associated with client devices for services of the client system. The custom access policy describes a set of access levels corresponding to variable levels of access to services of the service provider. The identity provider authenticates access requests by client devices using one or more device signals from the client devices. In some embodiments, the identity provider determines a device trust score for the client device using the one or more device signals. The identity provider provides an authentication response to the client system based on the custom access policy. The client system uses the authentication response to determine an access level for the client device from the set of access levels described by the custom access policy.

20 Claims, 6 Drawing Sheets

(56) References Cited

U.S. PATENT DOCUMENTS

2020/0412540 A1* 12/2020 Sabath ................ H04L 63/0807
2021/0160247 A1*  5/2021 Gaddam ............... H04L 67/306
2022/0124098 A1   4/2022 Shiralkar et al.

* cited by examiner

PROVIDING FLEXIBLE SERVICE ACCESS USING IDENTITY PROVIDER

CROSS REFERENCE TO RELATED APPLICATIONS

This application is a continuation of and claims priority to U.S. patent application Ser. No. 17/076,760, filed Oct. 21, 2020, and entitled "PROVIDING FLEXIBLE SERVICE ACCESS USING IDENTITY PROVIDER," which is incorporated herein by reference in its entirety.

FIELD OF ART

The present invention generally relates to the field of software applications, and more specifically, to flexible authentication for software applications using identity providers.

BACKGROUND

Third-party identity providers supply service providers such as web-based applications with secure authentication by authenticating access requests by users of the client service providers (e.g., log-in requests). In doing so, identity providers remove the need for client service providers to needlessly implement their own authentication software to authenticate users or user devices. Furthermore, identity providers can simplify the user experience by allowing users of service providers (e.g., web applications) to configure authentication processes on a single identity provider and subsequently rely on that identity provider to authenticate on one or multiple client service providers that use the identity provider.

However, identity providers typically only provide client service providers with a simple indication that an authentication request was either authorized or rejected. As such, client service providers using an identity provider are wholly dependent on the identity provider to make authentication decisions.

SUMMARY

An identity provider provides flexible access to third-party service providers. A service provider establishes a custom access policy with an identity provider to use for authenticating access requests by client devices for services of the service provider. In particular, the custom access policy describes a set of access levels corresponding to variable levels of access to services associated with the service providers (e.g., no access, limited access, full access, etc.). The custom access policy can further describe custom authentication procedures or parameters for the identity provider, such as one or more device signals. The service provider communicates with the identity provider to authenticate access requests associated with (e.g., provided by) client devices using the custom access policy. The identity provider obtains one or more device signals from the client device and uses the one or more device signals to authenticate the access request. In embodiments, the identity provider determines a device trust score for the client device using the one or more device signals. After authenticating the client device, the identity provider provides an authentication response to the service provider based on the custom access policy. The authentication response can include information used or determined by the identity provider in performing the authentication, such as the device trust score or context-related information of the client device. The service provider uses the authentication response to determine an access level for the client device from the set of access levels described by the custom access policy. The service provider can then provide the client device access to services in accordance with the determined access level.

In some embodiments, the third-party service provider receives a request for access to one or more services from a client device. Based on the access request, the third-party service provider requests authentication of the access request by the identity provider using a custom access policy for the third-party service provider. In particular, the custom access policy describes a plurality of access levels including at least a limited access level and a full access level. After the identity provider authenticates the access request using the custom access policy, the third-party service provider receives an authentication response from the identity provider determined using one or more device signals of the client device. Using the authentication response, the third-party service provider determines an access level for the client device. After determining the access level, the third-party service provider determines whether to provide the client device access to the one or more services in accordance with the determined access level.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

Computing Environment

Figure 1:
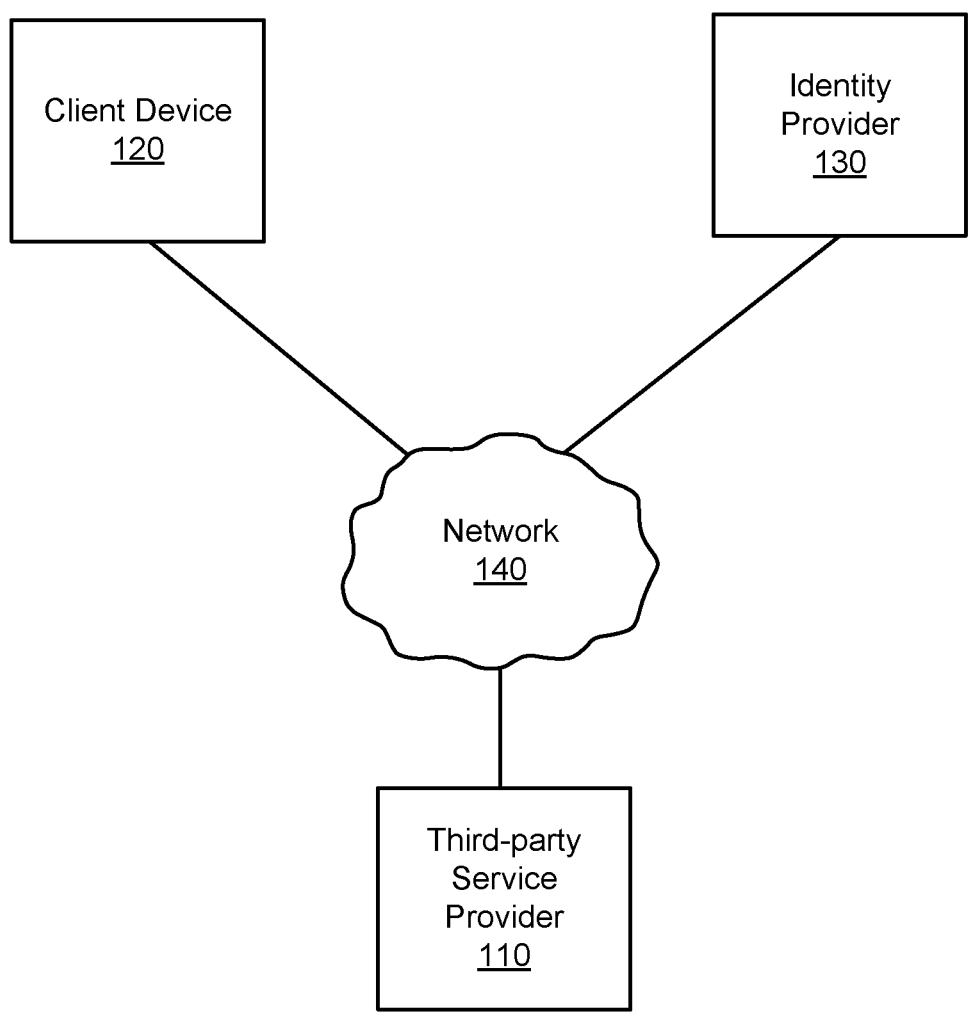
FIG. 1 is a block diagram illustrating a computing environment for providing flexible client system service access using an identity provider, according to one embodiment.

FIG. 1 is a block diagram illustrating one embodiment of a computing environment 100 for providing flexible access to a third-party service provider 110 using an identity provider 130. In the embodiment shown, the computing environment 100 includes a third-party service provider 110, a client device 120, an identity provider 130, and a network 140. The third-party service provider 110 provides the user of the client device 120 with access to a service, such as (for example) SALESFORCE, MICROSOFT OFFICE 365, SLACK, DOCUSIGN, ZOOM, or the like. In some embodiments, the user using the client device 120 is a member of an organization (e.g., an employee of a corporation) that contracts with the identity provider 130 to handle authentication on behalf of the organization's members with the third-party services used by the organization. In different embodiments, the computing environment 100 may include different or additional elements than those illustrated in FIG. 1. Furthermore, the functionality may be distributed among the elements in a different manner than described.

The third-party service provider 110 is a service provider for one or more online services accessible via one or more client devices (e.g., the client device 120). In particular, the third-party service provider 110 communicates with the identity provider 130 via an authentication integration (e.g., single sign-on capabilities) to provide authentication of requests by client devices for access to services of the third-party service provider 110, hereinafter access requests. An authentication integration is a set of information or processes shared between the third-party service provider 110 and the identity provider 130 that enables client devices 120 to access services of the third-party service provider 110 via authentication by the identity provider 130. For instance, an authentication integration can enable a user of the client device 120 to log-in to an account associated with third-party service provider 110 using the client device 120. In embodiments, the third-party service provider 110 is associated with a custom access policy used by the identity provider 130 to authenticate access requests associated with (e.g., provided by) client devices for services of the third-party service provider 110. The custom access policy describes a set of access levels (e.g., authorizations) corresponding to variable levels of access to one or more services associated with the third-party service provider 110. The custom access policy can additionally, or alternatively, describe a custom set of device signals for the identity provider 130 to use for authenticating access requests. Device signals are described in greater detail below with reference to the client device 120 and FIG. 3. The custom access policy may be provided to the identity provider 130 via an interface provided by the identity provider 130 (e.g., a web application), or may be provided directly to the identity provider 130 by the third-party service provider 110. As an example, the third-party service provider 110 can request authentication of access requests received from the client device 120 by the identity provider 130 using a custom access policy for the client device 120.

The third-party service provider 110 further receives authentication responses from the identity provider 130 determined for access requests by the client device 120 using the custom access policy. In general, the authentication response indicates the results of authentication of the access request by the identity provider 130 (e.g., whether the access request was authenticated or rejected, etc.) using the custom access policy and can include information used or determined by the identity provider 130 in performing the authentication. The authentication response can include a device trust score determined by the identity provider 130 based on the custom access policy. The device trust score is a value indicating a trust level for the client device 120 (e.g., a risk score). The authentication response can additionally, or alternatively, include information describing a context of the client device 120 (i.e., "context information") or other authentication information used by the identity provider 130. The third-party service provider 110 uses the authentication response to determine an access level for the client device 120, such as one of the sets of access levels described by the custom access policy. For instance, the determined access level can provide the client device 120 access to one or more services of the third-party service provider 110, such as providing read-only access to data for lower access levels but full access to the data for higher access levels. Although only a single client device 120 is depicted in FIG. 1, the third-party service provider 110 can provide services to for any number of client devices.

In some embodiments, the custom access policy of the third-party service provider 110 has distinct configurations at the third-party service provider 110 and the identity provider 130 relevant to processes performed by the two entities. For example, at the identity provider 130 the custom access policy may describe what device signals are obtained by the identity provider 120, how to determine a device trust score, and what information is provided to the third-party service provider 110 in an authentication response. Conversely, at the third-party service provider the custom access policy may describe how the third-party service provider 110 processes an authentication response received from the identity provider 130 in order to determine an access level for the client device 120.

The client device 120 is a computing device operated by a user. The client device 120 can be various computing devices, such as a desktop computer, a laptop computer, a mobile device (e.g., a mobile phone, a tablet, etc.), or any other suitable computing device. In embodiments, the client device 120 provides authentication information to the identity provider 130 (e.g., in response to a request from the identity provider 130) to use for authenticating access requests associated with the client device for services of one or more client systems (e.g., the third-party service provider 110). For example, a user associated with the client device 120 may create an authentication profile at the identity provider 130 by providing login credentials (e.g., a username and password), other demographic information, or device signals for the client device 120. The client device 120 or another computing device associated with client device 120 can provide access requests to the identity provider 130 in order to gain access to services of one or more service providers (e.g., the third-party service provider 110) which a user of the client device 120 is permitted to access. In various embodiments, the client device 120 may access services of the third-party service provider 110 via a mobile application, a web application, a browser (e.g., a web page), or any other client-side interface of the third-party service provider 110. The client device 120 may further communicate with the third-party service provider 110 or the identity provider 130 via software integrated with a software development kit (SDK) of the third-party service provider 110. In this case, the client device 120 may provide access requests to the third-party service provider 110 or the identity provider 130 using software tools provided by the SDK. The SDK may be implemented using various programming languages (e.g., Java, C++, Python, etc.). Access requests may be initiated via the third-party service provider 110 or the identity provider 130 For instance, the third-party service provider 110 may redirect (e.g., via an HTTP redirect) a client device to an interface associated with the identity provider 130 (e.g., a login interface) for submitting an access request (e.g., a login interface of the identity provider 130).

In some embodiments, the client device 120 is enrolled in multi-factor authentication (MFA) services of the identity provider 120 and is used for providing MFA factors (e.g., passwords, authentication tokens, voice calls, etc.). In this case, a user of the client device 120 may provide an access request for authentication by the identity provider 130 through a different computing device than the client device 120. In order to authenticate the access request, the identity provider 130 may perform authentication using the client device 120 (e.g., by obtaining authentication credentials or one or more device signals form the client device 120, as described above.)

In some embodiments, the client device 120 is managed by the identity provider 130. In particular, when the identity provider 130 is initially enrolling the client device 120, the identity provider 130 provides authentication information to the client device 120 (e.g., a trust certificate). After the authentication information is provided to the client device 120 during enrollment, the client device 120 can later provide the authentication information back to the identity provider 130 to use for authenticating access requests by the client device 120. Information indicating a management status of the client device 120 by the identity provider 130 (e.g., managed, unmanaged, unknown, etc.) can further be used as a device signal to authenticate access requests associated with the client device 120. The management status of the client device 120 may further be provided to the third-party service provider 110, such as in an authentication response. In cases where the client device 120 is managed, the client device 120 may be one of several devices in an organization's enterprise network environment.

The identity provider 130 is an authentication system that performs authentication for one or more service providers. In particular, the identity provider 130 authenticates access requests associated with client devices (e.g., the client device 120) for access to services of one or more service providers (e.g., the third-party service provider 110). In embodiments, the identity provider 130 uses an authentication integration established with the third-party service provider 110 to authenticate access requests associated with client devices for services of the third-party service provider 110. The identity provider 130 is configured to receive a custom access policy for the third-party service provider 110 to use for authenticating access requests, as described above with reference to the third-party service provider 110. Using the authentication integration, the identity provider 130 can receive access requests for services of the third-party service provider 110 by client devices (e.g., the client device 120). The identity provider 130 may have previously received authentication information for the client device 120 (e.g., user or device authentication credentials), or may request the authentication information from the client device 120 after receiving the access request. After authenticating the client device 120 based on the custom access policy, the identity provider 130 provides an authentication response to the third-party service provider 110 to use in determining an access level for the client device 120.

The identity provider 130 can further obtain one or more device signals for the client device 120 in order to authenticate the received access request. Device signals can include various characteristics of the client device 120, such as a geographic location of the client device 120 (e.g., GPS coordinates), an Internet Protocol (IP) address of the client device 120, anti-malware software version installed on the client device 120, an operating system version of the client device 120, a management status of the client device 120 (e.g., managed or unmanaged), an authentication credential type of the client device 120 (e.g., certificate, secret, enrollment identifier, unknown, etc.), a hardware attestation type of the client device 120 (e.g., signed trusted platform module (TPM), hardware encryption, software encryption, unknown), a multi-factor authentication enrollment status of the client device 120, or any other device characteristic accessible by the identity provider 130. The particular device signals obtained by the identity provider 130 may be described in the custom access policy for the third-party service provider 110. Furthermore, the identity provider 130 can process the one or more device signals obtained from the client device 120 to determine a device trust score for the client device that indicates a trust level for the client device. As an example, the identity provider 130 may assign a less trustworthy device trust score to the client device 120 if the client device is attempting to access services of the third-party service provider 110 from a significantly different geographic location than it had previously (e.g., a different country).

In some embodiments, the identity provider 130 determines a trust score for a client device 120 in addition to performing a general authentication (e.g., the device successfully proves its identity to the identity provider 130). For example, the identity provider 130 may first perform a general authentication of a client device 120 using authentication credentials provided by the client device or another computing device associated with an access request (e.g., a password, a signed authentication token, a multi-factor authentication factor, etc.) before determining a device trust score for the client device. As such, determining the device trust score may be part of an authorization process performed by the identity provider 130 to determine an access level for the client device 120 that is successfully authenticated through a general authentication process.

In some embodiments, the identity provider 130 uses one or more external identity providers—such as Facebook, Google, or any other online service that provides authentication for service providers—to authenticate access requests associated with client devices. For example, the identity provider 130 may forward access requests from the client device 120 to an external identity provider in order for the external identity provider to authenticate the access request. Similarly, the identity provider 130 may process an authentication response received from an external identity provider (e.g., using the custom access policy for the third-party service provider 110) and forward its own authentication response based on the processing to the client system 110.

The network 140 connects the third-party service provider 110, the client device 120, and the identity provider 130. The network 140 may be any suitable communications network for data transmission. In an embodiment such as that illustrated in FIG. 1, the network 140 uses standard communications technologies or protocols and can include the internet. In another embodiment, the entities use custom or dedicated data communications technologies.

Figure 2:
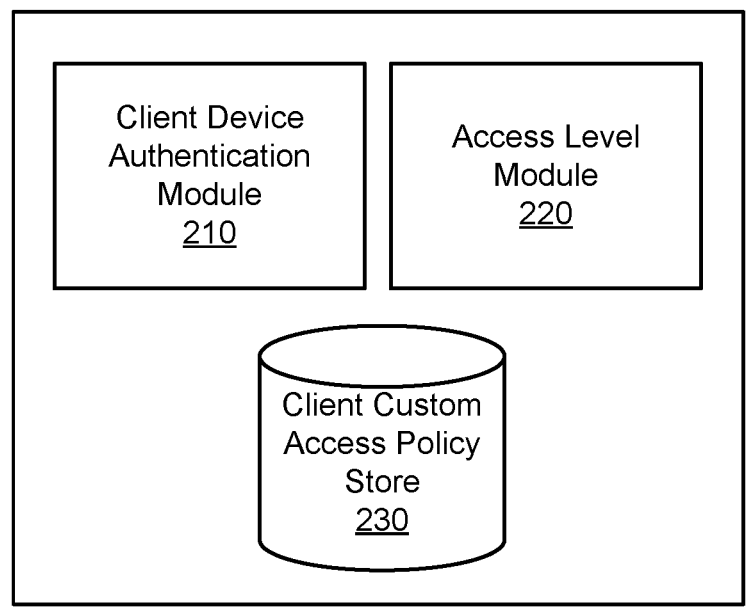
FIG. 2 is a block diagram illustrating a client system, according to one embodiment.

FIG. 2 is a block diagram illustrating one embodiment of the third-party service provider 110. In the embodiment shown, the third-party service provider 110 includes a client device authentication module 210 that manages authentication integrations, an access level module 220 that determines an access level for authenticated client devices, and a client custom access policy store 230 that stores custom access policies for client systems of the third-party service provider 110. In other embodiments, the third-party service provider 110 may include different or additional elements. Furthermore, the functionality may be distributed among the elements in a different manner than described. The components of FIG. 2 are now described in more detail.

The client device authentication module 210 manages an authentication integration between the third-party service provider 110 and the identity provider 130. In embodiments, the client device authentication module 210 or the identity provider 130 establishes an authentication integration between the third-party service provider 110 and the identity provider 130. third-party service provider 110 The authentication integration includes a custom access policy associated with the third-party service provider 110 and used by the identity provider 130 to authenticate access requests, as described below with reference to the access level module 220 and the identity provider 130. After an authentication integration for the third-party service provider 110 is established, the client device authentication module 210 may process requests to access services of the third-party service provider 110 using the authentication integration. For instance, the client device authentication module 210 may redirect a user of the client device 120 to an interface associated with the identity provider 130 that can receive authentication information for the user and provide the authentication information to the identity provider 130. The client device authentication module 210 may receive the user authentication information and provide the authentication information to the identity provider 130, or the authentication information may be provided by the client device 120 directly to the identity provider.

After an access request is authenticated by the identity provider 130, the client device authentication module 210 receives an authentication response from the identity provider 130. The client device authentication module 210 uses the authentication response to determine whether to provide access to one or more services of the third-party service provider 110 to the client device 120. In particular, the client device authentication module 210 can provide the authentication response to the access level module 220 to obtain an access level for the client device, as described below. The client device authentication module 210 can provide the client device 120 with the access level in order to facilitate access to the one or more services by the client device 120 or to prevent access by the client device 120, in accordance with the authentication response. For example, if the access level indicates that the client device 120 can access some or all of the requested services of the third-party service provider 110, the client device authentication module 210 may provide the client device 120 a security token usable to access the relevant services (e.g., in an API request) or other information indicating which services can be accessed. Different service providers use different access levels corresponding to different services depending on a risk tolerance of the service provider (e.g., granting more or less access for different device trust scores). Furthermore, the access level determined for a particular access request may depend on the services requested in the access request. For example, some services may only be accessible to client devices with higher access levels (e.g., reading confidential data), while other services may be accessible to client device with lower access levels (e.g., reading public data).

In some embodiments, the authentication integration between the third-party service provider 110 and the identity provider 130 is configured can an authentication integration interface provided by the identity provider 130. Example authentication integration interfaces include an application programming interface (API) a web application, or a mobile application. The authentication configuration interface can additionally, or alternatively, be used to provide custom access policies for the third-party service provider 110 to the identity provider 130. Once the identity provider 130 is configured to provide authentication services for the third-party service provider 110, the identity provider 130 can receive access requests for services of the third-party service provider 110 by the client device 120, such as from the third-party service provider 110 or directly from the client device 120. The identity provider 130 may have previously received authentication information for the client device 120 (e.g., user or device authentication credentials), or may request the authentication information from the client device 120 after receiving the access request.

In some embodiments, the third-party service provider 110 and the identity provider 130 communicate using security assertion markup language (SAML). For instance, the third-party service provider 110 and the identity provider 130 can use SAML to provide single sign-on (SSO) capabilities to the client device 120. In such embodiments, the request for authentication of the access request received by the identity provider 130, as well as the authentication response received by the third-party service provider 110 from the identity provider, is represented using SAML. In particular, the third-party service provider 110 and the identity provider 130 exchange SAML assertions represented as XML documents. SAML assertions can include SAML attributes corresponding to information in the custom access policy. For example, a SAML attribute in a SAML assertion provided by the identity provider 130 to the third-party service provider 110 may include a device trust score or information describing a context of the client device. In other embodiments, the third-party service provider 110 and the identity provider 130 can communicate using other formats in order to authenticate access requests associated with client devices.

The access level module 220 determines an access level for the client device 120 from multiple access levels based on an authentication response from the identity provider 130 after authenticating an access request by the client device 120. In embodiments, the access level module 220 determines an access level from the set of access levels defined by the custom access policy associated with the third-party service provider 110. The access level module 220 may receive information describing the custom access policy from the identity provider 130, or may access the custom access policy stored in the client custom access policy store 230. The set of access levels of the custom access policy can include any number of access levels that correspond to variable levels of access to services of the third-party service provider 110. In particular, the set of access levels can include at least a full access level corresponding to access to all services of the third-party service provider 110, a limited access level corresponding to access to a subset of services of the third-party service provider 110, and a rejected access level corresponding to preventing access to any services of the third-party service provider 110. The access level module 220 processes information included in the authentication response in order to determine the access level.

In some embodiments, the authentication response includes a device trust score determined by the identity provider 130 based on one or more device signals of the client device 120. In particular, the access level module 220 can compare the device trust score to device trust score thresholds corresponding to respective access levels of the set of access levels. As an example, the device trust score may be a risk score or value from 0.0 to 1.0, where 0.0 indicates no risk (e.g., the device is trusted) and 1.0 indicates substantial risk (e.g., the device is not trusted). In this case, the set of access levels may correspond to device trust score thresholds between 0.0 and 1.0, such as 0.5 for limited access and 0.1 for full access. In the same or different embodiments, the custom access policy of the third-party service provider 110 can include information indicating how the device trust score for the client device 120 should be determined. For example, the custom access policy may specify which device signals are used to determine the device trust score. Additionally, or alternatively, the custom access policy may specify one or more custom weights for the device signals used to determine the device trust score, where the custom weights indicate a degree to which a corresponding device signal should influence the device trust score. In embodiments where the authentication response includes the device trust score, the identity provider 130 provides authentication knowledge to the third-party service provider 110 without releasing any personally identifiable information (e.g., the one or more device signals used to compute the device trust score) to the third-party service provider 110.

In some embodiments, the authentication response includes information describing a context of the client device 120. For instance, the authentication response may indicate that the client device 120 is managed or unmanaged, trusted or untrusted, low risk or high risk, etc. In this case, the access level module 220 can process the context information in order to determine an access level for the client device 120. For example, the access level module 220 may associate managed client devices with a particular access level (e.g., full access).

In some embodiments, the custom access policy for the third-party service provider 110 is provided to the identity provider 130 via an interface of the identity provider 130 (e.g., the authentication integration interface). For instance, an administrator of the third-party service provider 110 may submit the custom access policy through the authentication integration interface provided by the identity provider 130. The identity provider 130 can provide an authentication integration interface (e.g., an application programming interface (API), a web application, a mobile application, etc.) for configuring the authentication integration for the third-party service provider 110. The authentication configuration interface can be used to provide custom access policies for the third-party service provider 110 to the identity provider 130. Once the identity provider 130 is configured to provide authentication services for the third-party service provider 110, the identity provider 130 can receive access requests for services of the third-party service provider 110 by the client device 120, such as from the third-party service provider 110 or directly from the client device 120. The identity provider 130 may have previously received authentication information for the client device 120 (e.g., user or device authentication credentials), or may request the authentication information from the client device 120 after receiving the access request.

Figure 3:
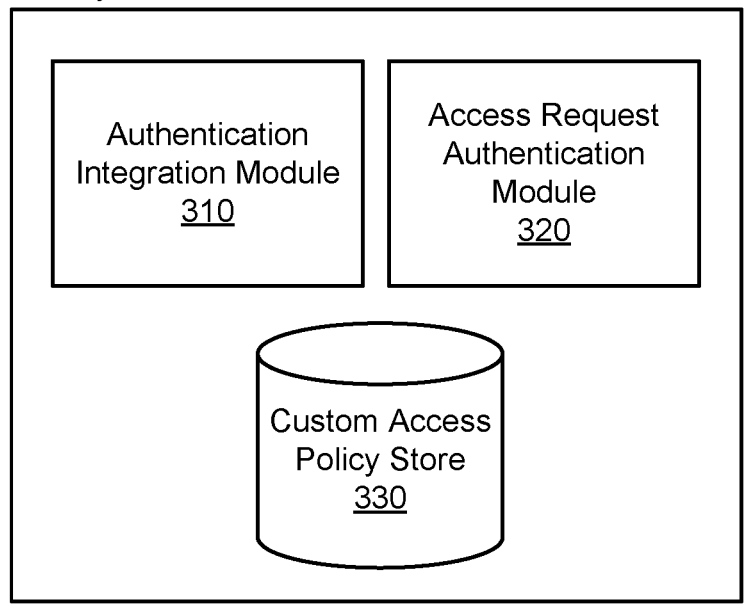
FIG. 3 is a block diagram illustrating an identity provider, according to one embodiment.

FIG. 3 is a block diagram illustrating one embodiment of an identity provider 130. The identity provider 130 may be an embodiment of the identity provider 130 depicted in FIG. 1. In the embodiment shown, the identity provider 130 includes an authentication integration module 310 that manages authentication integrations for service providers, an access request authentication module 320 that authenticates access request by client devices, and a custom access policy store 330 that stores custom access policies for service providers. In other embodiments, the identity provider may include different or additional elements. Furthermore, the functionality may be distributed among the elements in a different manner than described.

The authentication integration module 310 manages authentication integrations for systems that use the identity provider 130 to authenticate access requests (e.g., the third-party service provider 110). In embodiments, the authentication integration module 310 provides an authentication integration interface to client systems that can be used to configure client system authentication integrations and provide custom access policies, as described above with reference to the client system 200.

In some embodiments, the authentication integration module 310 manages the client device 120, as described above with reference to FIG. 1. In particular, the authentication integration module 310 provides authentication information to the client device 120 which can then be used to authenticate access requests associated with the client device 120. The access request authentication module 320 authenticates requests by client devices (e.g., the client device 120) for access to one or more services of the third-party service provider 110. In embodiments, the access request authentication module 320 uses an authentication integration for the third-party service provider 110 established by the authentication integration module 310 to authenticate an access request. If the authentication integration for the third-party service provider 110 is associated with a custom access policy, such as those stored in the custom access policy store 330, the authentication integration module 310 uses the custom access policy to authenticate the access request. The access request authentication module 320 can obtain device signals from the client device 120 to use for authenticating access requests. For instance, the custom access policy for the third-party service provider 110 may specify one or more device signals to use for authenticating access requests from the client device 120. In some embodiments, the device signals are included in an access request from the client device 120. After authenticating an access request, the access request authentication module 320 provides an authentication response to the third-party service provider 110 using the authentication integration, such as a device trust score determined by the third-party service provider 110.

The access request can include authentication information for the client device 120, such as login credentials of a user associated with the client device 120 or a trust certificate provided to the client device 120 by the identity provider 130. The access request authentication module 320 may store authentication information associated with the user or the client device 120 (e.g., in an authentication profile). In this case, the access request authentication module 320 can compare information in the stored authentication profile to the received authentication information as part of authenticating the access request. The access request authentication module 320 may consider authentication information provided by the client device 120, one or more device signals for the client device 120, a device trust score determined for the client device 120, or some combination thereof in authenticating an access request by the client device 120.

In some embodiments, the access request authentication module 320 determines a device trust score for an access request using one or more device signals of the client device 120. The access request authentication module 320 can use various techniques to determine the device trust score. In one embodiment, the access request authentication module 320 uses one or more machine learning models to determine a device trust score for the client device 120 (i.e., a device trust score model). A device trust score model takes as input one or more device signals (e.g., ten, twenty, thirty signals) and outputs a corresponding device trust score for the access request by the client device 120. In particular, the device trust score model may be configured to determine a device trust score using some or all of a set of possible device signals, and the access request authentication module may collect and input some or all of the set of possible device signals into the risk model in accordance with a custom access policy. The device trust score model may consider additional information to determine a device trust score for the client device 120, such as device signals from previous access requests by the client device 120 (e.g., stored by the identity provider 130). In this case, the device trust score model may determine a device trust score for the client device 120 indicating a higher trust level after authenticating multiple access requests from the client device 120. The access request authentication module 320 may additionally, or alternatively, use information included in the custom access policy for the third-party service provider 110 to determine the device trust score. For instance, the custom access policy may indicate one or more specific device signals or include custom weights for one or more device signals to use in determining the device trust score, as described above with reference to the access level module 220. The access request authentication module 320 may further process the device trust score in accordance with the custom access policy for the third-party service provider 110. For instance, the access request authentication module 320 may map a raw device trust score value to one or more access levels (e.g., limited access) defined by the custom access policy.

The access authentication module 320 can use various machine learning or other statistical techniques to determine a device trust score for the client device 120 based on one or more device signals. These techniques can include supervised neural networks (e.g., convolutional neural networks), support vector machines, linear regression, logistic regression, decision trees, and any other supervised learning technique usable to train a model to predict a device trust score for client devices. These techniques can also include unsupervised neural networks (e.g., autoencoders, adversarial networks, etc.), k-means clustering, principal component analysis, and any other unsupervised learning technique usable to usable to train a model to predict a device trust score for client device using one or more device signals. In various embodiments, the access authentication module 320 uses one or more machine learning techniques described above to train a machine learning pipeline including one or more models configured to predict a device trust score for client devices. In the same or different embodiments, the access request module 320 includes information describing a context of the client device 120 in the authentication response. For instance, the custom access policy for the third-party service provider 110 may specify device context information to include in the authentication response. In doing so, the identity provider 130 exposes intermediate results of authentication to the third-party service provider 110, such as a trust score or access level, allowing the third-party service provider 110 to perform special processing using the intermediate results in the authentication response (e.g., determination of a flexible access level for the client device 120). Furthermore, the identity provider 130 provides the intermediate results of authentication to the third-party service provider 110 without providing underlying private data of the client device 120 used to perform the authentication (e.g., one or more device signals), thus maintaining data privacy.

Techniques for Providing Flexible Service Access

Figure 4:
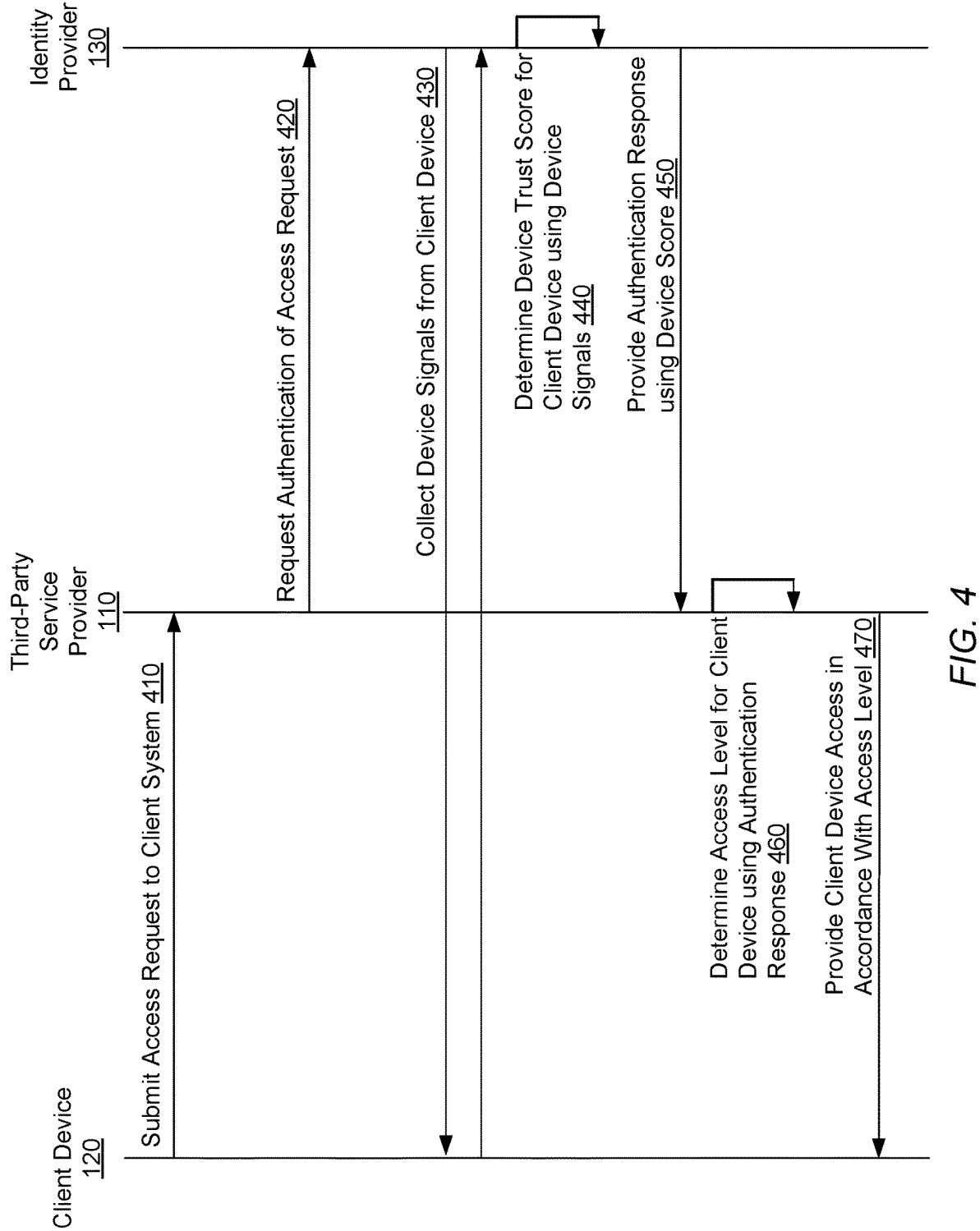
FIG. 4 is a sequence diagram illustrating interactions between a service provider, a client device, and an identity provider, according to one embodiment.

FIG. 4 is a sequence diagram illustrating an embodiment of interactions between the third-party service provider 110, the client device 120, and the identity provider 130. In other embodiments than that shown in FIG. 4, some or all of the steps may be performed by other entities or components. In addition, some embodiments may perform the steps in parallel, perform the steps in different orders, or perform different steps.

In the embodiment shown in FIG. 4, the sequence of interactions begins with the client device 120 submitting 410 an access request to the third-party service provider 110. For example, a user of the client device 120 may attempt to access one or more services of the third-party service provider 110 via the client device 120. In response to the access request, the third-party service provider 110 requests 420 authentication of the access request by the identity provider 130. For example, the third-party service provider 110 may use an authentication integration established with the identity provider 130 to request authentication of the access request by the identity provider 130. In some cases, the third-party service provider 110 redirects the client device 120 to an interface associated with the identity provider 130 for submitting the access request to the identity provider 130 (e.g., a login request).

Based on the request for authentication of the access request, the identity provider 130 collects 430 device signals from the client device 120. For instance, the identity provider 130 may collect device signals specified in a custom access policy for the third-party service provider 110. As an example, in response to receiving an access request for services of the third-party service provider 130 from client device 120, the identity provider 130 can process the custom access policy for the third-party service provider to determine a set of device signals to collect from the client device 120. In some embodiments, the access request received by the identity provider 130 already includes one or more device signals. Using the collected device signals, the identity provider 130 determines 440 a device trust score for the client device 120. For example, the identity provider 130 may input the device signals into a device trust score model to determine a device trust score for the client device 120. After determining 440 the device trust score, the identity provider 130 provides 450 the authentication response to the client system. The identity provider 130 may format the authentication response based on the custom access policy for the third-party service provider 110. For instance, the authentication response may include a device trust score or device context information.

Using the authentication response, the third-party service provider 110 determines 460 an access level for the client device 120 from a set of access levels described by the custom access policy for the third-party service provider 110. Depending on the authentication response, the access level may correspond to preventing access to one or more services of the third-party service provider 110, granting limited access to one or more services of the third-party service provider 110, or granting full access to one or more services of the third-party service provider 110. Furthermore, the access level may correspond to preventing access to some services and also granting full or partial access to other services. In accordance with the determined access level, the third-party service provider 110 provides 470 the client device 120 access to services of the third-party service provider 110.

Figure 5:
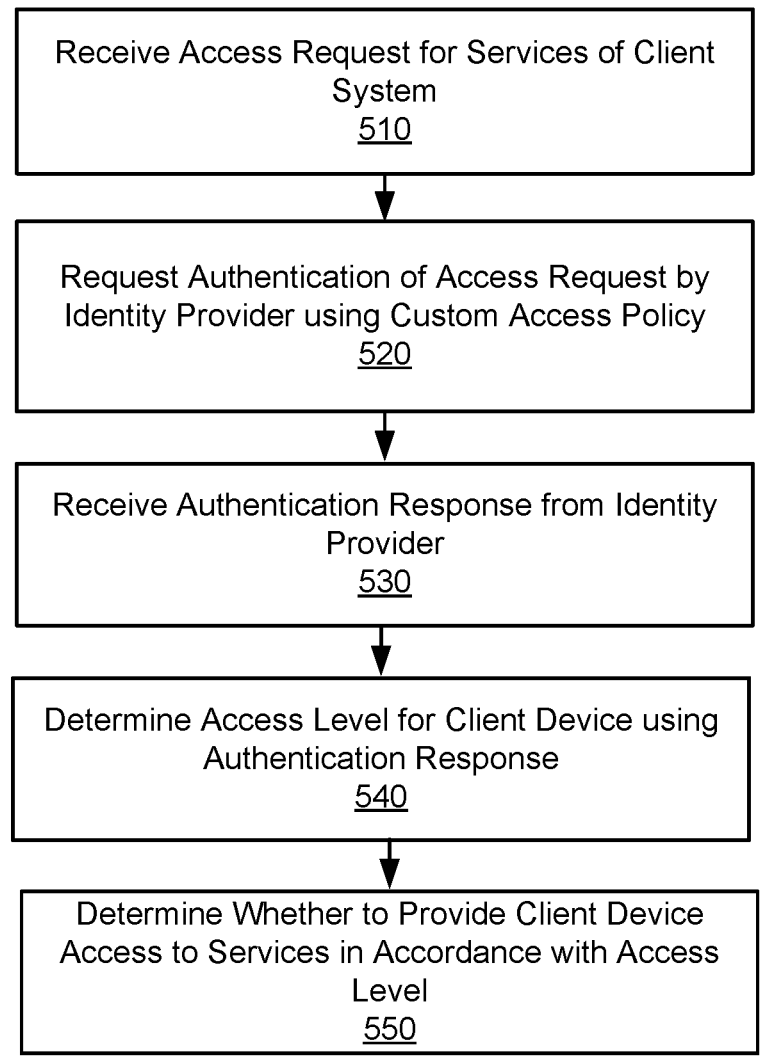
FIG. 5 is a flowchart illustrating a process for providing flexible access to services of a service provider using an identity provider, according to one embodiment.

FIG. 5 is a flowchart illustrating a process 500 for providing flexible access to services of the third-party service provider 110 using the identity provider 130, according to one embodiment. In the embodiment shown, the steps of FIG. 5 are illustrated from the perspective of the third-party service provider 110 performing the method 500. However, some or all of the steps may be performed by other entities or components. In addition, some embodiments may perform the steps in parallel, perform the steps in different orders, or perform different steps.

In the embodiment shown in FIG. 5, the process 500 begins with the third-party service provider 110 receiving 510 a request for access to one or more services from the client device 120. For example, a user of the client device 120 may attempt to access one or more services of the third-party service provider 110, such as logging in to an account associated with the user for the third-party service provider 110. Based on the access request, the third-party service provider 110 requests 520 authentication of the access request by the identity provider 130 using a custom access policy for the third-party service provider 110. In particular, the custom access policy describes a plurality of access levels including at least a limited access level and a full access level. Alternatively, the client device 120 may submit the access request directly to the identity provider 130. After the identity provider 130 authenticates the access request using the custom access policy, the third-party service provider 110 receives 530 an authentication response from the identity provider 130 determined using one or more device signals of the client device 120. For example, the identity provider may provide an authentication response to the third-party service provider 110 including a device trust score for the client device 120. Using the authentication response, the third-party service provider 110 determines 540 an access level for the client device 120. The access level may grant no access, limited access, or full access to services of the third-party service provider 110. As an example, the third-party service provider 110 may determine an access level with a device trust score threshold corresponding to a device trust score included in the authentication response. After determining the access level, the third-party service provider 110 determines 550 whether to provide the client device access to the one or more services in accordance with the determined access level. For example, the third-party service provider 110 may communicate with the client device 120 to allow or prevent access to certain services of the third-party service provider 110.

For example, if the access level is a partial access level and the client device 120 is attempting to interact with data hosted by the third-party service provider 110 (e.g., documents), the partial access level may allow the client device 120 to read the data and full access may allow the client device 120 additionally to write to the data. As another example, if the client device 120 is attempting to access paid services (e.g., a subscription), the partial access level may allow the client device 120 to access free services that still require having an account (e.g., being logged in), while full access may allow the client device 120 to access the paid services.

As such, through the process 500 or other processes described herein, the third-party service provider 110 can customize authentication through the identity provider 130 in order to provide the client device 120 variable access to services (or another computing device providing an access request associated with the client device 120, such as part of MFA). In particular, by configuring the custom access policy of the third-party service provider 130 at the identity provider 130, the third-party service provider 110 controls how one or more device signals accessible to the identity provider 130 are used to authenticate access requests associated with the client device 120. Furthermore, this can be done by the third-party service provider 110 without accessing the one or more device signals directly, thus maintaining data privacy for the client device. In contrast, conventional systems would not allow the third-party service provider 110 to control the processing of one or more device signals used for authentication by the identity provider 130. Furthermore, conventional systems conventional systems authenticating the client device 120 via a conventional identity provider would either allow or deny the client device 120 access to the requested services. In doing so, conventional systems provide a less dynamic end-user experience.

EXEMPLARY COMPUTER ARCHITECTURE

Figure 6:
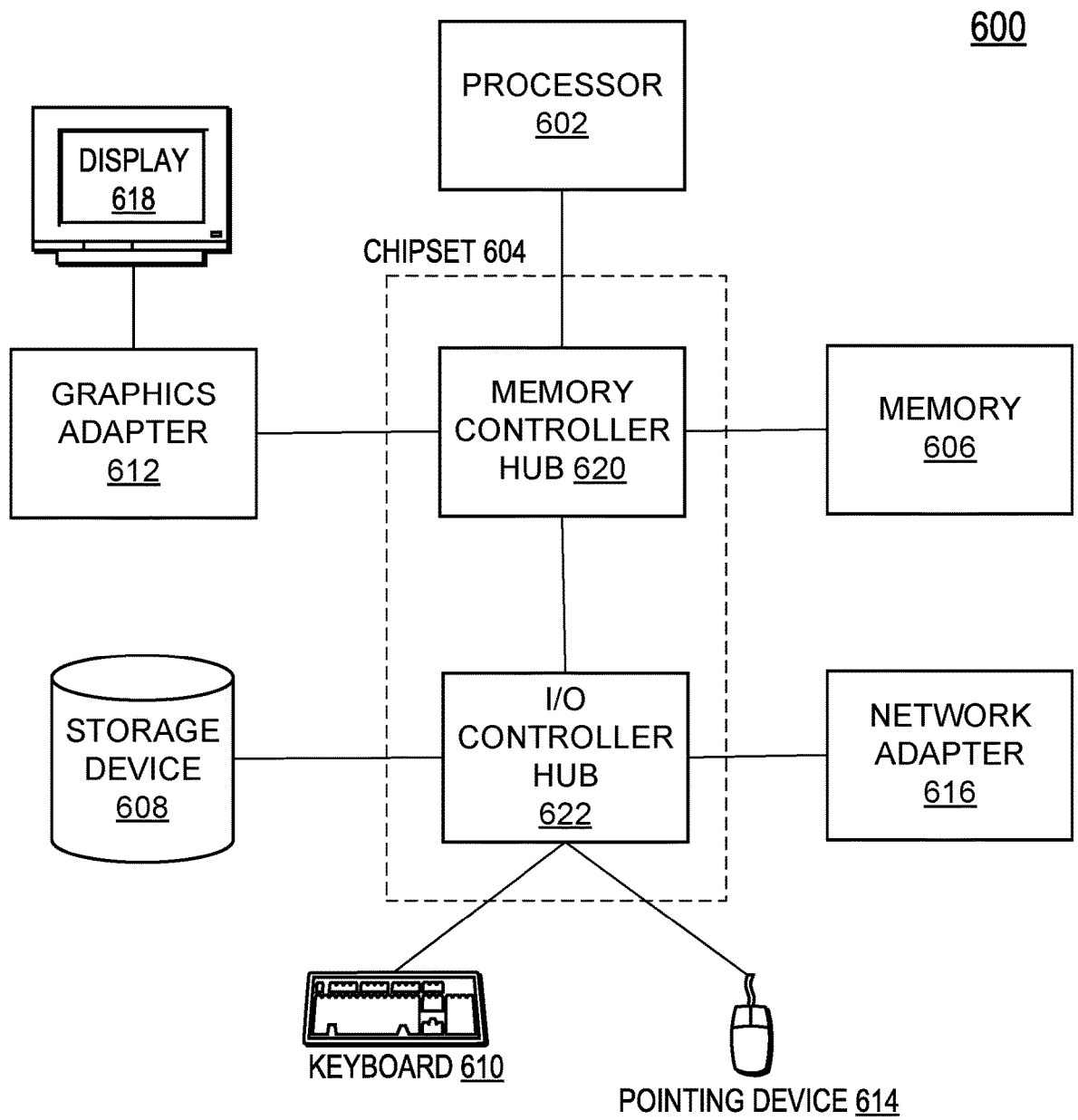
FIG. 6 is a block diagram illustrating physical components of a computer used as part or all of the service provider, the client device, or the identity provider from FIG. 1, according to one embodiment.

FIG. 6 is a block diagram illustrating physical components of a computer 600 used as part or all of the third-party service provider 110, the client device 120, or the identity provider 130 from FIG. 1, in accordance with an embodiment. Illustrated are at least one processor 602 coupled to a chipset 604. Also coupled to the chipset 604 are a memory 606, a storage device 608, a graphics adapter 612, and a network adapter 616. A display 618 is coupled to the graphics adapter 612. In one embodiment, the functionality of the chipset 604 is provided by a memory controller hub 620 and an I/O controller hub 622. In another embodiment, the memory 606 is coupled directly to the processor 602 instead of the chipset 604.

The storage device 608 is any non-transitory computer-readable storage medium, such as a hard drive, compact disk read-only memory (CD-ROM), DVD, or a solid-state memory device. The memory 606 holds instructions and data used by the processor 602. The graphics adapter 612 displays images and other information on the display 618. The network adapter 616 couples the computer 600 to a local or wide area network.

As is known in the art, a computer 600 can have different and/or other components than those shown in FIG. 6. In addition, the computer 600 can lack certain illustrated components. In one embodiment, a computer 600, such as a host or smartphone, may lack a graphics adapter 612, and/or display 618, as well as a keyboard 610 or external pointing device 614. Moreover, the storage device 608 can be local and/or remote from the computer 600 (such as embodied within a storage area network (SAN)).

As is known in the art, the computer 600 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 608, loaded into the memory 606, and executed by the processor 602.

Other Considerations

The present invention has been described in particular detail with respect to one possible embodiment. Those of skill in the art will appreciate that the invention may be practiced in other embodiments. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely for purposes of example, and is not mandatory; functions performed by a single system component may instead be performed by multiple components, and functions performed by multiple components may instead performed by a single component.

Some portions of the above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment. Similarly, use of "a" or "an" preceding an element or component is done merely for convenience. This description should be understood to mean that one or more of the element or component is present unless it is obvious that it is meant otherwise.

Where values are described as "approximate" or "substantially" (or their derivatives), such values should be construed as accurate +/−10% unless another meaning is apparent from the context. From example, "approximately ten" should be understood to mean "in a range from nine to eleven."

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

What is claimed is:

1. A computer-implemented method executed by an identity provider device, the computer-implemented method comprising:
   receiving, from a service provider device associated with a service provider, a request for authentication of an access request associated with a client device;
   selecting, from a plurality of custom access policies associated with a plurality of service providers, a custom access policy associated with the service provider, wherein the selected custom access policy indicates one or more types of device signals to use in determining a device trust score and indicates a plurality of access levels associated with the service provider, the plurality of access levels including at least a limited access level and a full access level;
   receiving, from the client device, one or more device signals associated with one or more characteristics of the client device;
   selecting, from the received one or more device signals and based on the one or more types of device signals indicated in the selected custom access policy, at least one device signal associated with at least one characteristic of the client device to use to determine the device trust score;
   determining, using a machine learning model that receives the selected at least one device signal associated with the at least one characteristic of the client device as input, the device trust score for the client device;
   generating, based at least in part on the device trust score, an authentication response for determining an access level, of the plurality of access levels, associated with access to one or more services of the service provider by the client device; and
   providing, to the service provider device, the authentication response.

2. The computer-implemented method of claim 1, further comprising:
processing the custom access policy to determine a set of device signals from the client device that are available to the identity provider device for collection,
wherein receiving the one or more device signals comprises collecting, based at least in part on processing the custom access policy, the set of device signals from the client device.

3. The computer-implemented method of claim 1, wherein receiving the one or more device signals comprises receiving the one or more device signals via the access request.

4. The computer-implemented method of claim 1, wherein the custom access policy includes one or more custom weights corresponding to the one or more device signals, and
wherein the one or more custom weights are used by the machine learning model in determining the device trust score.

5. The computer-implemented method of claim 1, wherein the custom access policy further provides rules for determining the device trust score and information to be included in the authentication response.

6. The computer-implemented method of claim 1, wherein the request for authentication is received from the service provider device using an authentication integration, and
wherein the authentication integration is used for communication between the identity provider device and the service provider device.

7. The computer-implemented method of claim 1, wherein providing the authentication response comprises:
formatting, based at least in part on the custom access policy, the authentication response; and
providing the formatted authentication response.

8. The computer-implemented method of claim 1, wherein the authentication response includes context information for the client device, and
wherein the context information comprises indications of whether the client device is managed, unmanaged, trusted, untrusted, low risk, high risk, or a combination thereof.

9. The computer-implemented method of claim 1, wherein the one or more device signals include one or more of a location of the client device, an Internet Protocol (IP) address of the client device, a version of anti-malware software installed on the client device, an operating system version of the client device, an identity provider management status of the client device, an authentication credential type of the client device, a hardware attestation type of the client device, or a multi-factor enrollment (MFA) status of the client device.

10. An identity provider device comprising:
a processor; and
memory storing instructions that, when executed by the processor, cause the identity provider device to:
receive, from a service provider device associated with a service provider, a request for authentication of an access request associated with a client device;
select, from a plurality of custom access policies associated with a plurality of service providers, a custom access policy associated with the service provider, wherein the selected custom access policy indicates one or more types of device signals to use in determination of a device trust score and indicates a plurality of access levels associated with the service provider, the plurality of access levels including at least a limited access level and a full access level;
receive, from the client device, one or more device signals associated with one or more characteristics of the client device;
select, from the received one or more device signals and based on the one or more types of device signals indicated in the selected custom access policy, at least one device signal associated with at least one characteristic of the client device to use to determine the device trust score;
determine, using a machine learning model that receives the selected at least one device signal associated with the at least one characteristic of the client device as input, the device trust score for the client device;
generate, based at least in part on the device trust score, an authentication response for determination of an access level, of the plurality of access levels, associated with access to one or more services of the service provider by the client device; and
provide, to the service provider device, the authentication response.

11. The identity provider device of claim 10, wherein the instructions, when executed by the processor, further cause the identity provider device to:
process the custom access policy to determine a set of device signals from the client device that are available to the identity provider device for collection, and
wherein, to receive the one or more device signals, the instructions cause the identity provider device to collect, based at least in part on the custom access policy being processed, the set of device signals from the client device.

12. The identity provider device of claim 10, wherein the custom access policy includes one or more custom weights corresponding to the one or more device signals, and
wherein the one or more custom weights are used by the machine learning model to determine the device trust score.

13. The identity provider device of claim 10, wherein the custom access policy further provides rules for determining the device trust score and information to be included in the authentication response.

14. The identity provider device of claim 10, wherein the request for authentication is received from the service provider device using an authentication integration, and
wherein the authentication integration is used for communication between the identity provider device and the service provider device.

15. The identity provider device of claim 10, wherein to provide the authentication response, the instructions, when executed by the processor, cause the identity provider device to:
format, based at least in part on the custom access policy, the authentication response; and
provide the formatted authentication response.

16. A non-transitory, computer-readable medium storing instructions that, when executed by a processor of an identity provider device, cause:
receiving, from a service provider device associated with a service provider, a request for authentication of an access request associated with a client device;
selecting, from a plurality of custom access policies associated with a plurality of service providers, a custom access policy associated with the service provider, wherein the selected custom access policy indicates one or more types of device signals to use in determining a device trust score and indicates a plurality of access levels associated with the service provider, the plurality of access levels including at least a limited access level and a full access level;

receiving, from the client device, one or more device signals associated with one or more characteristics of the client device;

selecting, from the received one or more device signals and based on the one or more types of device signals indicated in the selected custom access policy, at least one device signal associated with at least one characteristic of the client device to use to determine the device trust score;

determining, using a machine learning model that receives the selected at least one device signal associated with the at least one characteristic of the client device as input, the device trust score for the client device;

generating, based at least in part on the device trust score, an authentication response for determining an access level, of the plurality of access levels, associated with access to one or more services of the service provider by the client device; and providing, to the service provider device, the authentication response.

17. The non-transitory, computer-readable medium of claim 16, wherein the instructions, when executed by the processor of the identity provider device, cause:

processing the custom access policy to determine a set of device signals from the client device that are available to the identity provider device for collection, wherein receiving the one or more device signals comprises collecting, based at least in part on processing the custom access policy, the set of device signals from the client device.

18. The non-transitory, computer-readable medium of claim 16, wherein the custom access policy includes one or more custom weights corresponding to the one or more device signals, and wherein the one or more custom weights are used by the machine learning model in determining the device trust score.

19. The non-transitory, computer-readable medium of claim 16, wherein the custom access policy further provides rules for determining the device trust score and information to be included in the authentication response.

20. The non-transitory, computer-readable medium of claim 16, wherein the request for authentication is received from the service provider device using an authentication integration, and wherein the authentication integration is used for communication between the identity provider device and the service provider device.

* * * * *